United States Patent Office 3,840,495
Patented Oct. 8, 1974

3,840,495
HEAT-STABLE POLYMERS BASED ON BIS-IMIDES AND OLIGOMERIC AMINES
Maurice Balme, Sainte-Foy-les-Lyon, Jean Gattus, La Mulatiere, and Bernard Gerard, Lyon, France, assignors to Rhone-Poulenc S.A., Paris, France
No Drawing. Filed Oct. 20, 1971, Ser. No. 191,121
Claims priority, application France, Oct. 23, 1970, 38,362; June 24, 1971, 23,066
Int. Cl. C08g 20/32
U.S. Cl. 260—65
11 Claims

ABSTRACT OF THE DISCLOSURE

Thermosetting polymers having excellent thermal stability are provided which consist essentially of a three-dimensional polyimide obtained by reacting, between 50° C. and 350° C., (a) a bis-imide of general formula:

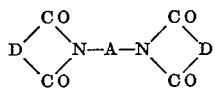

in which D represents a divalent organic radical containing a carbon-carbon double bond and A represents a divalent organic radical possessing 2 to 30 carbon atoms, and (b) a polyamine of average general formula:

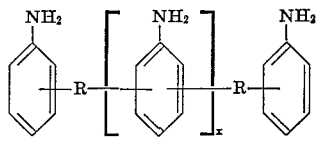

in which $x$ represents a number ranging approximately from 0.1 to 2 and R represents a divalent hydrocarbon radical having 1 to 8 carbon atoms, derived from an aldehyde or from a ketone of general formula:

$$O=R$$

in which the oxygen atom is bonded to a carbon atom of the radical R, the number of imide groups introduced by the bis-imide being from 1.1 to 50 per—$NH_2$ group introduced by the polyamine.

---

The present invention relates to heat-stable polymers based on three-dimensional polyimides.

Our French Pat. No. 1,555,564 describes thermosetting polymers obtained by reacting a N,N′-bis-imide of an unsaturated dicarboxylic acid with a diprimary diamine; the reagents are used in equimolar proportions or with an excess of bis-imide. Furthermore French Pat. No. 2,022,609 discloses heat-stable resins which are obtained from a bis-maleimide, a polyamine having at least two primary amino groups and an amine which is either a polyamine having at least two amino groups of which at least one is secondary, a primary monoamine or a secondary monoamine.

The present invention provides new heat-stable thermosetting polymers based on three-dimensional polyimides obtained by reacting, between 50° C., and 350° C., (a) a bis-imide of general formula:

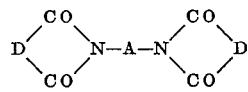

in which D represents a divalent organic radical containing a carbon-carbon double bond and A represents a divalent organic radical possessing 2 to 30 carbon atoms, and (b) a polyamine of average general formula:

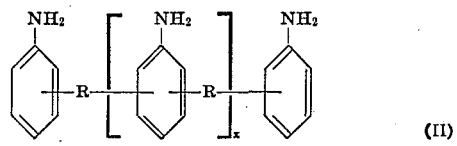

in which $x$ represents a number ranging from approximately 0.1 to 2 and R represents a divalent hydrocarbon radical having 1 to 8 carbon atoms and derived from an aldehyde or from a ketone of general formula:

$$O=R \qquad (III)$$

in which the oxygen atom is bonded to a carbon atom of the radical R, the number of imide groups introduced by the bis-imide being from 1.1 to 50 per—$NH_2$ group introduced by the polyamine.

Suitable aldehydes and ketones of formula (III), include formaldehyde, acetaldehyde, benzaldehyde, oenanthaldehyde, acetone, methyl ethyl ketone, 2-hexanone, cyclohexanone and acetophenone.

The polyamines (II) can be obtained in accordance with known processes, such as those described in French Pats. Nos. 1,430,977, 1,481,935 and 1,533,696. The crude mixtures of oligomers obtained by these processes can be enriched with one or more of their constituents, for example by distillation under reduced pressure.

The symbol D is derived from an anhydride of an ethylenic dicarboxylic acid of general formula:

such as maleic anhydride, citraconic anhydride, itaconic anhydride, pyrocinchonic anhydride and dichloromaleic anhydride, as well as the Diels-Alder reaction products of one of these anhydrides with an acyclic, alicyclic or heterocyclic diene. As regards the anhydrides resulting from a diene synthesis, reference can be made to volume IV of "Organic Reactions" (John Wiley & Sons, Inc.); in particular, tetrahydrophthalic anhydride and endomethylene-tetrahydrophthalic anhydride may be mentioned.

The symbol A may, for example, represent a linear or branched alkylene radical having less than 13 carbon atoms, a phenylene or cyclohexylene radical, or a radical of formula:

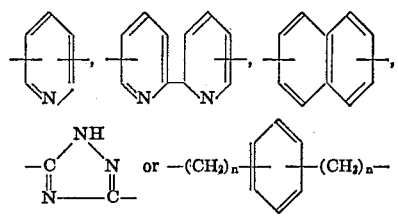

wherein $n$ represents an integer from 1 to 3. The symbol A can also represent several phenylene or cyclohexylene radicals joined to one another by a simple valency bond or by an atom or an inert group, such as —O—, —S—, an alkylene group having from 1 to 3 carbon atoms, —CO—, —SO$_2$—, —NR$_1$—, —N=N—, —CONH—, —P(O)R$_1$—,

—CONH—X—NHCO—,

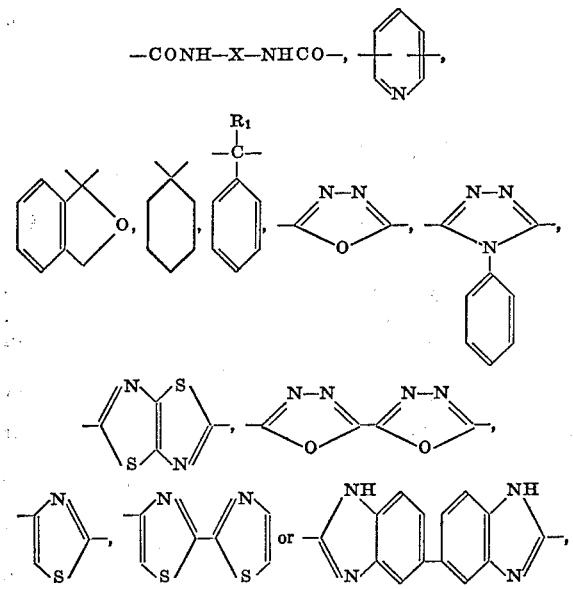

wherein R$_1$ represents a hydrogen atom, an alkyl radical having from 1 to 4 carbon atoms, a phenyl radical or a cyclohexyl radical and X represents an alkylene radical having less than 13 carbon atoms. The various phenylene or cyclohexylene radicals can be substituted by methyl groups, for example.

Specific examples of bis-imides (a) which may be used include:

N,N'-ethylene-bis-maleimide,
N,N'-hexamethylene-bis-maleimide,
N,N'-*meta*-phenylene-bis-maleimide,
N,N'-*para*-phenylene-bis-maleimide,
N,N'-4,4'-diphenylmethane-bis-maleimide,
N,N'-4,4'-diphenyl-ether-bis-maleimide,
N'N'-4,4'-diphenylsulphone-bis-maleimide,
N,N'-4,4'-dicyclohexylmethane-bis-maleimide,
N,N'-α,α'-4,4'-dimethylene-cyclohexane-bis-maleimide,
N,N'-*meta*-xylylene-bis-maleimide,
N,N'-*para*-xylylene-bis-maleimide,
N,N'-4,4'-diphenyl-cyclohexane-bis-maleimide,
N,N'-*meta*-phenylene-bis-tetrahydrophthalimide,
N,N'-4,4'-diphenylmethane-bis-citraconimide,
N,N'-4,4'-diphenyl-1,1-propane-bis-maleimide,
N,N'-4,4'-triphenylmethane-bis-maleimide,
N,N'-4,4'-triphenyl-1,1,1-ethane-bis-maleimide, and
N,N'-3,5-triazole-1,2,4-bis-maleimide.

These bis-imides can be prepared by, for example, the methods described in U.S. Pat. No. 3,018,290 and British Specification No. 1,137,592.

Preferably the relative amounts of bis-imide and polyamine used are such as to introduce from 1.2 to 5 imide groups per —NH$_2$ group introduced by the polyamine.

The polymers according to this invention can advantageously be prepared in two stages.

In the first stage, a prepolymer (P) is prepared by heating the bis-imide and the polyamine, at between 50° C., and 250° C. for example; the prepolymer can be shaped whilst in the form of a solution, a suspension, a powder or a liquid mass. The prepolymers particularly proposed are those of softening point between 100° C., and 200° C.; they can be obtained by heating the bis-imide and the polyamine in bulk until a homogeneous liquid or pasty mixture is obtained. The temperature used depends on the melting point of the starting materials but, as a general rule, is between 80° C., and 180° C. It is advantageous to homogenise the mixture of the reagents beforehand. The prepolymers can also be prepared by heating the reagents in a polar solvent such as dimethylformamide, N-methylpyrrolidone, dimethylacetamide, N-methylcaprolactam, diethylformamide or N-acetylpyrrolidone, suitably to a temperature of between 50° C., and 180° C. For numerous uses, the solutions of prepolymers can be employed as they are; it is also possible to isolate the prepolymer from its solution by precipitation by means of a diluent which is miscible with the polar solvent and does not dissolve the prepolymer; water or a hydrocarbon of boiling point not significantly exceeding 120° C., can be used as the diluent.

The prepolymers can be prepared in the presence of a catalyst consisting of a strong acid. By "strong acid" as used herein is meant, in the Brönsted sense, monoacids or polyacids of which at least one of the acid groups has an ionisation constant (pKa) of less than 4.5. Typical such acids include inorganic acids such as hydrochloric, sulphuric, nitric or phosphoric acid, where appropriate substituted by an organic radical, as in for example the sulphonic and phosphonic acids. The acids can also be carboxylic acids; these can be of a simple structure or can possess groups which do not interfere with the reaction between the bis-imide (I) and the polyamine (II). The preferred acid is maleic acid. The acids are generally employed in an amount from 0.5 to 5% by weight relative to the weight of the bis-imide (I).

The prepolymers can be used in the form of a liquid mass, with simple hot casting sufficing to shape them. It is also possible to use them, after cooling and grinding, in the form of powders which lend themselves remarkably well to compression moulding operations, where appropriate in the presence of fillers, in the form of powders, beads, granules, fibres or flakes. In the form of solutions, the prepolymers can be used for the production of coatings and of pre-impregnated intermediates, the support being, for example, fibrous material based on a silicate or oxide of aluminium or zirconium, carbon, graphite, boron, asbestos or glass. The uses of the prepolymers are described in greater detail in our copending application No. 190,815 filed on even date herewith and entitled "Aqueous Polyimide Compositions."

In the second stage, the prepolymers are heat-cured at tempreatures of up to about 350° C., generally between 100° and 300° C.; a supplementary shaping can be carried out during curing, if appropriate *in vacuo* or under superatmosphere pressure; these operations can also be carried out consecutively. The curing can be carried out in the presence of a radical polymerisation initiator such as lauroyl peroxide, cumyl peroxide or azobisisobutyronitrile, or of an anionic polymerisation catalyst such as diazabicyclooctane.

The mechanical properties of the polymers intended to undergo long-term heat tests can be improved by the incorporation of an anhydride of an aromatic tricarboxylic or tetracarboxylic acid. These can be monoanhydrides such as those of general formula:

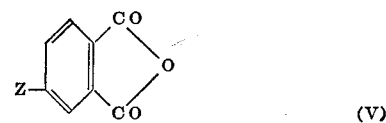

(V)

in which the symbol Z represents a group such as

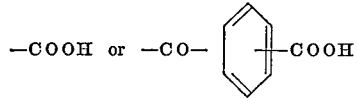

Suitable monoanhydrides include trimellitic anhydride and the anhydride of benzophenone-3,4,4'-tricarboxylic acid. The anhydrides can also be dianhydrides such as pyromellitic anhydride or a dianhydride of general formula:

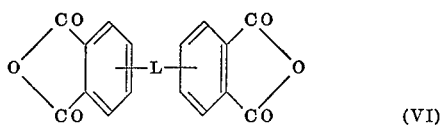

(VI)

in which the symbol L repersents a divalent radical such as

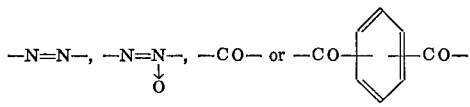

Amongst these latter dianhydrides, there may more particularly be mentioned azophthalic anhydride and the dianhydrides of *m*- or *p*-bis-(3,4-dicarboxy-benzoyl)benzene. The anhydride is advantageously incorporated into the prepolymer (P) in amounts of the order of 1 to 5% by weight relative to the weight of the prepolymer.

The polymers of this invention can also contain, by way of an adjuvant, an aromatic compound (AR) possessing 2 to 4 benzene rings, which cannot be sublimed at atmospheric pressure up to 250° C., and which has a boiling point of above 250° C. In these aromatic compounds, the benzene rings can form condensed nuclei or can be joined to one another by a valency bond or by an inert atom or group such as

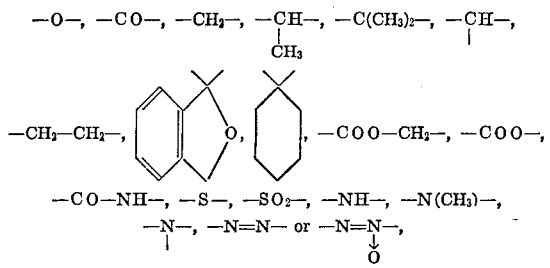

it being understood that in any one compound the overall linkage of the rings can take place through a combination of these different types of linkage. The benzene rings can be substituted by inert radicals such as —CH₃, —OCH₃, —F, —Cl and —NO₂. By way of example, there may be mentioned the isomeric terphenyls, the the chlorinated diphenyls, phenyl ether, 2,2'-naphthyl ether, *o*-methoxyphenyl ether, benzophenone, 2,5,4'-trimethylbenzophenone, *p*-phenylbenzophenone, *p*-fluorobenzophenone, diphenylamine, diphenylmethylamine, triphenylamine, azobenzene, 4,4'-dimethylazobenzene, az- oxybenzene, diphenylmethane, 1,1 - diphenylethane, 1, 1-diphenylpropane, triphenylmethane, diphenylsulphone, phenyl sulphide, 1,2-diphenylethane, *p*-diphenoxybenzene, 1,1-dephenyl-phthalane, 1,1-diphenylcyclohexane, phenyl benzoate, benzyl benzoate, *p*-nitrophenyl terephthalate and benzanilide. These aromatic adjuvants are suitably used in amounts up to about 10% by weight relative to the weight of the prepolymer (P) or to the weight of the mixture of the reagents. The adjuvant (AR) can be added to the prepolymer (P) or can be introduced into the mixture at any time during its preparation.

The addition of these aromatic compounds gives rise to articles which, after curing, are even more resistant to prolonged heat exposure; this is particularly perceptible in the case of articles moulded by compression. These adjuvants also are of value for the production of prepolymer compositions intended to be shaped in the liquid state, because they make it possible to extend the period for which the prepolymer can be used in the molten state; furthermore, they lower the softening point of the prepolymers.

The prepolymers (P) can also be used in the form of a solid dispersed in a liquid phase consisting of water and, optionally, a polar oragnic solcent (S) which is miscible with water, has a boiling point ranging from 110° C. to 170° C. and constitutes up to 50% by weight of the liquid phase. Amongst organic solvents S, those having a boiling point which does not significantly differ from the range 120° C.–250° C., and which are solvents for the prepolymer over at least a part of the temperature range of 25° to 150°, are preferred. Typical solvents (S) which can be used include 2-methoxy-ethanol, 2-ethoxy-ethanol and their acetates, N-methylpyrrolidone, dimethylformamide, dimethylacetamide, N-methcaprolactam, N-acetylpyrrolidone and diethylformamide. The use of N-methylpyrrolidone is particularly advantageous. This prepolymer can represent 5 to 50%, preferably from 15% to 45%, by weight of the weight of the suspension. Where an organic solvent is present, it preferably represents from 5% to 35% of the weight of the liqiud phase.

The preparation of the suspensions is generally carried out at ambient temperature (20° to 30°) and consists of dispersing the prepolymer in the liquid medium. The prepolymer may be used in a divided state, the dimensions of the particles being preferably less than 100μ. The prepolymer can be dispersed in the liquid phase by applying conventional stirring methods. When the suspensions comprise an organic solvent, the latter can be introduced at the start, as a solution in the water; it is also possible to prepare the suspension of prepolymer in water beforehand and then to add the organic solvent at the end or at the time of use of the suspension. These suspensions can be used directly after their preparation but as they are remarkably stable on storage they can conveniently be kept for subsequent use. They are preferably kept in closed vessels at temperatures below 30° and above their freezing point.

These suspensions can be used for the preparation of composite materials; they are of very particular value for the production of coatings and of intermediate pre-impregnated articles wherein the support is a fibrous material, such as one based on a silicate or oxide of aluminium or zirconium, carbon, graphite, boron, asbestos or glass. In the case of glass, they may consist of rovings, yarns, tows or fabrics, such as satin or taffetas, formed from continuous fibres; it is also possible to use yarns or woven or non-woven fabrics produced from a combination of staple fibres. The fibrous material can be impregnated by applying the usual techniques, such as immersion or transfer-impregnation; it is advantageous to pre-moisturise the fibres with water, optionally in combination with an organic solvent (S). With suspensions which contain an organic solvent, the impregnation can be carried out rapidly without losing its effectiveness.

The fibrous materal coated with the suspension can thereafter be dried, preferably in a ventilated atmosphere; the temperature and duration of drying vary depending, naturally, on whether the composition does or does not contain an organic solvent, and as a function of the volatility of the solvent which may be used. As a general rule, the drying is carried out at between 100° C., and 200° C., for from 1 hour to several minutes. The pre-impregnated articles thus obtained can be used directly after drying or they can be stored for subsequent use; they retain their properties remarkably well during storage at ambient temperature (20°–30° C.) or below. Amongst their possible uses, there may be mentioned filament windings and the production of laminates in the form of sheets or complex shapes.

The polymers of this invention are of very particular value in industries which require materials possessing good mechanical and electrical properties as well as high chemical inertness at temperatures of 220° to 300°. Thus they are very suitable for use in the manufacture of insulators, in the form of plates or tubes, for dry transformers, transformer blocks and motor armatures, in printed circuits, honeycomb-structure panels, and compressor vanes.

The following examples further illustrate the present invention.

EXAMPLE 1

50.1 g. of N,N'-4,4'-diphenylmethane-bis-maleimide and 14.3 g. of a polyamine of average formula:

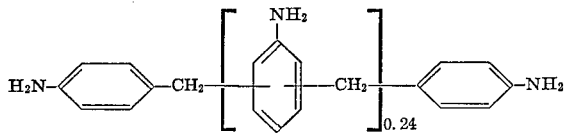

were intimately mixed.

The mixture was kept in a heated chamber at 150° C. for 10 minutes and then cast into a vertical parallelepiped mould (125 x 75 x 6 mm.), the internal walls of which had a silicone resin coating, and which had be forehand been heated to 200° C. The whole was left for 1 hour in a heated chamber at 200° C. and the article was then removed from the mould whilst hot. The moulded article was then subjected to a supplementary heat treatment for 24 hours at 250° C. It then had a flexural breaking strength of 12.5 kg./mm.$^2$ at 25°; at 250° C., it was 9.2 kg./mm.$^2$. After heat exposure at 250° C. for 850 hours in a ventilated chamber, the flexural breaking strength at 25° C. was 13.5 kg./mm.$^2$.

EXAMPLE 2

A mixture of 71.6 g. of N,N'-4,4'-diphenylmethane-bis-maleimide and 16.3 g. of the polyamine used in Example 1 was heated at 170° C. for 13 minutes. After cooling and grinding, a prepolymer was obtained in the form of a powder of softening point of the order of 140° C. 25 g. of this powder were introduced into a cylindrical mould (diameter: 76 mm., height: 6 mm.). The mould was placed between the plates of a press previously heated to 250° C. and the whole was pressed under a pressure of 250 bars. After 1 hour, the article was removed from the mould whilst hot and then subjected to a supplementary heat treatment for 48 hours at 250° C. It then had a flexural breaking strength of 12.2 kg./mm.$^2$ at 25° C.

EXAMPLE 3

A prepolymer was prepared by heating a mixture of 45.2 g. of N,N'-4,4'-diphenylmethane-bis-maleimide and 10 2 g. of a polyamine of average formula:

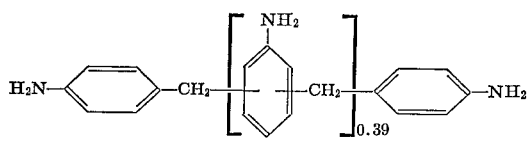

for 8 minutes at 150° C. After cooling and grinding, the prepolymer had a softening point of about 106° C.

52.5 g. of the prepolymer were introduced, whilst stirring, into a solution consisting of 84.7 g. of water and 15 g. of N-methylpyrrolidone, and the whole was then stirred for a further 30 minutes. 166 g. of the suspension thus obtained were used to coat 27 dm.$^2$ of a satin type glass fibre fabric of specific weight 308 g./m.$^2$; this fabric had beforehand been desized by heating and then pretreated with gamma-aminopropyltriethoxysilane. After coating, the fabric was dried for 20 minutes at 140° C. in a ventilated atmosphere.

After cooling, 12 square samples (15 x 15 cm.) were cut from this fabric and then stacked so as to form a laminated assembly. This assembly was then heated to 100° C. between the platens of a preheated press. The temperature was raised to 250° C. over one hour, under a pressure of 30 bars.

The whole was allowed to cool under pressure to 150° C. and the laminate was then released; it was finally subjected to a supplementary heat treatment at 250° C. for 24 hours. It then had a flexural breaking strength of 56.5 kg./mm.$^2$ at 25° C. At 250° C., it was 40.7 kg./mm.$^2$.

After a heat exposure for 1,900 hours at 200° C., the flexural strength, measured at 200° C., was still 47.8 kg./mm.$^2$.

We claim:

1. A polymer which consists essentially of a three-dimensional polyimide obtained by reacting, between 50° C. and 350° C., (a) a bis-imide of general formula:

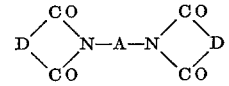

in which D represents a divalent organic radical containing a carbon-carbon double bond derived from an anhydride of the general formula:

selected from maleic, citraconic, itaconic, pyrocinchonic and dichloromaleic anhydride and Diels-Alder reaction products thereof with an acyclic, alicyclic or heterocyclic diene and A represents a divalent organic radical possessing 2 to 30 carbon atoms selected from a linear or branched alkylene radical having less than 13 carbon atoms, a phenylene or cyclohexylene radical or a radical of formula:

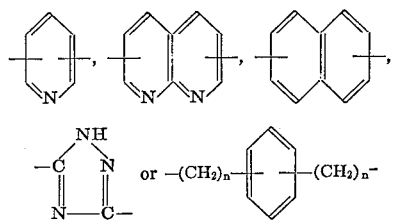

wherein $n$ represents an integer from 1 to 3 or several phenylene or cyclohexylene radicals joined to one another by a simple valency bond or by an oxygen or sulphur atom or by an inert group, and (b) a polyamine of average general formula:

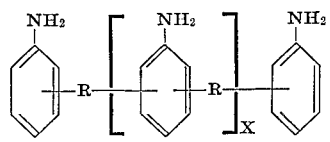

in which $x$ represents a number ranging approximately from 0.1 to 2 and R represents a divalent hydrocarbon radical having 1 to 8 carbon atoms, derived from an aldehyde or from a ketone of general formula:

$$O=R$$

in which the oxygen atom is bonded to a carbon atom of the radical R, the number of imide groups introduced by the bis-imide being from 1.1 to 50 per —NH$_2$ group introduced by the polyamine.

2. A polymer according to claim 1 in which the number of imide groups introduced by the bis-imide is 1.2 to 5 per —NH$_2$ group introduced by the polyamine.

3. A polymer according to claim 1 in which A represents a diphenylene methane group.

4. A polymer according to claim 1 in which D represents the radical —CH=CH—.

5. A polymer according to claim 1 in which R is derived from formaldehyde, acetaldehyde, benzaldehyde, oenanthaldehyde, acetone, methyl ethyl ketone, 2-hexanone, cyclohexanone or acetophenone.

6. A polymer according to claim 1 in which an anhydride of an aromatic di-, tri- or tetra-carboxylic acid is mixed with a prepolymer obtained by reacting between 50° and 250° C. the said bis-imide and the said polyamine.

7. A polymer according to claim 6 in which the anhydride is trimellitic pyromellitic, or azophthalic anhydride or the anhydride of benzophenone-3,4,4'-tricarboxylic acid or m- or p-bis(3,4-dicarboxy-benzoyl)-benzene.

8. A polymer according to claim 1 which is incorporated with an aromatic compound having two to four benzene rings, which has a boiling point above 250° C. and which cannot be sublimed at atmospheric pressure below 250° C.

9. A polymer according to claim 8 in which the aromatic compound is an isomeric terphenyl, chlorinated diphenyl, phenyl ether, 2,2'-naphthyl ether, o-methoxyphenyl ether, benzophenone, 2,5,4'-trimethylbenzophenone, p-phenylbenzophenone, p-fluorobenzophenone, diphenylamine, diphenylmethylamine, triphenylamine, azobenzene, 4,4' - dimethyl - azobenzene, azoxybenzene, diphenylmethane, 1,1-diphenylethane, 1,1-diphenylpropane, triphenylmethane, diphenylsulphone, phenyl sulphide, 1,2-diphenyl - ethane, p - diphenoxybenzene, 1,1 - diphenylphthalane, 1,1-diphenylcyclohexane, phenyl benzoate, benzyl benzoate, p-nitrophenylterephthalate or benzanilide.

10. A polymer according to claim 1 in which R represents a methylene group, D represents the radical

—CH=CH— and A represents diphenylene methane group.

11. A heat-stable composition which comprises a polymer as defined in claim 1 incorporated into a fibrous material.

References Cited
UNITED STATES PATENTS

| | | | |
|---|---|---|---|
| 3,679,639 | 7/1972 | Bargain et al. | 260—78 U |
| 3,658,764 | 4/1972 | Bargain et al. | 260—78 UA |
| 3,669,930 | 6/1972 | Asahara et al. | 260—47 CZ |
| 3,652,511 | 3/1972 | Vincent et al. | 260—78 UA |
| 3,637,901 | 1/1972 | Bargain et al. | 260—830 P |
| 3,625,912 | 12/1971 | Vincent et al. | 260—30.2 |
| 3,712,933 | 1/1973 | Docloux et al. | 260—857 |

LESTER L. LEE, Primary Examiner

U.S. Cl. X.R.

117—124 E, 126, AB, 132 B, 161 P; 161—227; 260—47 UA, 47 CZ, 78 UA